United States Patent Office 2,784,960
Patented Mar. 12, 1957

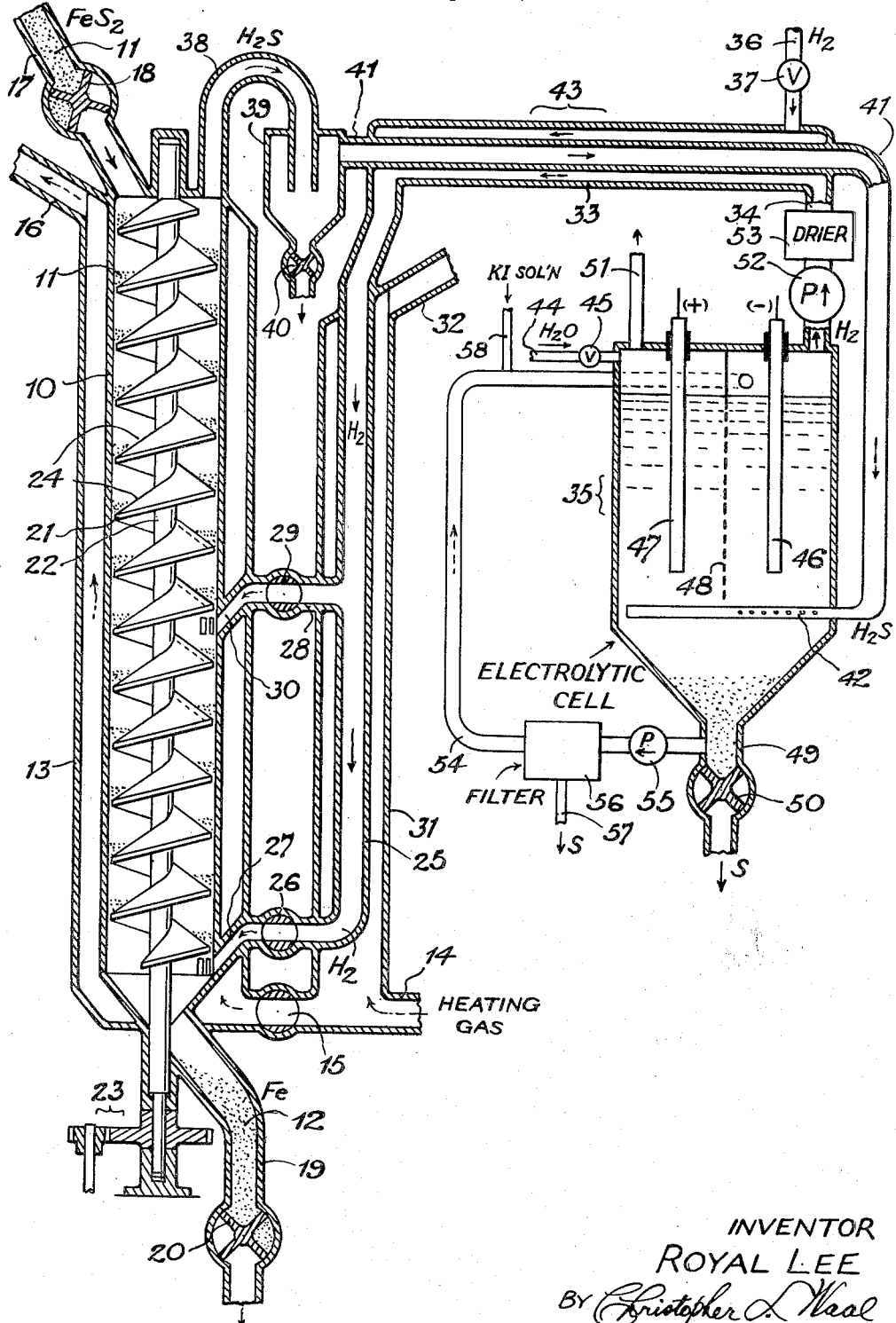

2,784,960
REDUCTION OF METALLIC SULFIDE ORES

Royal Lee, Elm Grove, Wis., assignor to Lee Foundation For Nutritional Research, Milwaukee, Wis., a corporation of Wisconsin Application September 26, 1952, Serial No. 311,648

2 Claims. (Cl. 266—24)

The present invention relates to apparatus for reduction of metallic sulfide ores.

An object of the invention is to provide an improved and efficient apparatus for reducing metallic sulfide ores by reaction with hydrogen.

Another object is to provide an ore reduction apparatus which will effect thorough exposure of comminuted ore material to the reducing gas.

The invention further consists in the several features hereinafter described and claimed.

The accompanying drawing shows a schematic view of an apparatus of the invention.

In accordance with the invention, a metallic sulfide ore reducible by hydrogen, such as iron pyrite or other ferriferous sulfide, is subjected to an atmosphere of hydrogen at a moderately high temperature to form the metal and hydrogen sulfide. The hydrogen sulfide is then removed from the reaction zone and decomposed by electrolyzing it in an aqueous solution, thereby releasing free hydrogen for reuse, and precipitating elemental sulfur.

To promote the reaction between the sulfide ore and the hydrogen, the ore is finely divided. In some cases, the pulverized ore is subjected to a concentrating action, such as by flotation, before the reducing treatment. In other cases, pulverization and reduction may be effected simultaneously, as in a ball mill or rotary kiln.

It is found that many metallic sulfides can be reduced in a hydrogen atmosphere at a moderately high temperature. In the case of iron pyrite or marcasite a reaction temperature of about 500° C. will reduce the ore to ferrous sulfide, and higher temperatures ranging up to about 1200° C. will reduce the ore to metallic iron. Preferarbly, the minimum reaction temperature is about 650° C. When iron in powdered form is desired the reaction temperature is kept below the point at which the iron becomes plastic. It is preferred to pass the pulverized ore and hydrogen in countercurrent relation, as in a tubular reaction chamber or furnace.

By means of the invention the metallic sulfide ore is directly reduced by hydrogen, thus obviating a roasting operation. The hydrogen is recovered and recycled, and the ore components are obtained in a useful form.

In the drawing, 10 designates a vertical tube forming a reaction chamber or furnace through which the pulverized sulfide ore 11 is passed downwardly into an upwardly moving stream of heated hydrogen to react therewith, forming powdered iron 12 and hydrogen sulfide. The reaction tube has a surrounding jacket 13 to provide heat insulation and to form a space through which a heating gas, such as flue gas, is passed upwardly to maintain the walls of the tube at a suitable temperature. The heating gas is conducted to the lower end of the tube jacket through a pipe 14, here shown to have a valve or damper 15, and the upper end of the jacket has an exhaust outlet 16. The pulverized ore 11 is fed downwardly into the upper end of the reaction tube, as through a feed pipe 17 with a rotary valve 18 forming an air seal, and the reduced pulverized iron 12 is gravitationally discharged from the lower end of the tube through a delivery pipe 19 with a rotary valve 20 forming an air seal. The downward travel of the pulverized ore in the reaction tube 10 is suitably retarded, as by a slowly rotating helicoidal worm 21 carried on a vertical shaft 22 which is disposed coaxially in the tube and is journalled at opposite ends. The worm fits loosely in the tube, and is suitably driven as by gearing 23. The upper surfaces 24 of the worm slope downwardly toward the tube walls so as to permit the pulverized ore to gravitate toward these walls. The velocity of the upwardly flowing hydrogen may also act to retard the descent of the pulverized ore. During the rotation of the worm, some or all of the pulverized ore will sift downwardly in a thin sheet between the peripheral edges of the worm and the inner side walls of the tube.

Hydrogen gas is heated to the desired temperature, and is conducted through a pipe or conduit 25 the lower end portion of which has a valve 26 and communicates with ports 27 at the lower end of the reaction chamber 10. In some instances, additional heated hydrogen may also be admitted to the chamber at one or more higher levels, as through a branch pipe 28 provided with a valve 29 and communicating with ports 30 in the side walls of the chamber. The hydrogen-conducting pipe 25 has a vertical portion with a surrounding jacket 31 connected at its lower end to the heating pipe 14 and having an exhaust outlet 32 at its upper end. The pipe 25 is here shown to include an upper horizontal portion 33 which is connected by a vertical portion 34 to an outlet of an electrolytic cell 35, hereinafter more fully described, which furnishes the hydrogen. The horizontal pipe portion 33 is also connected to an auxiliary supply pipe 36 having a valve 37, the auxiliary pipe furnishing hydrogen under pressure for starting and for make-up. The electrolytic cell may also be used to furnish starting and make-up hydrogen. While one electrolytic cell is shown, it will be understood that a battery of cells may be provided.

An outlet pipe 38 connects the upper end of the reaction tube or chamber 10 with the upper end of a settling or collecting chamber 39 for removing dust or sublimate, the chamber 39 having a bottom discharge valve 40 forming an air seal. A pipe 41 connects a side of the settling chamber 39 with the electrolytic cell and has a perforated portion 42 extending into the lower portion of the electrolytic cell 36 to conduct hydrogen sulfide to the cell. The pipe 41 extends longitudinally through the horizontal portion 33 of the hydrogen pipe to form a heat exchanger 43, thus heating the hydrogen and cooling the hydrogen sulfide. The hydrogen sulfide may be further cooled before it enters the electrolytic cell, so as to increase its solubility in the water contained in the cell. Water is fed into the cell through a pipe 44 having a valve 45. The cell has a cathode 46 and an anode 47 and is here shown to have a partition or diaphragm 48. The electrodes may be formed of graphite. The hydrogen sulfide is preferably fed into the cell at the cathode side thereof. The bottom of the cell converges downwardly to a pipe 49 having a discharge valve 50. The cell also has a gas outlet pipe 51 associated with the anode. The reducing gas is suitably circulated in the system, as by a pump 52 in the vertical pipe portion 34. Preferably, the hydrogen gas discharged from the electrolytic cell also passes through a drier 53 in the vertical pipe portion 34. The electrolyte is circulated through a pipe 54 which extends externally of the cell from the bottom portion to the top portion of the cell, this pipe having a pump 55 and a suitable filter and washer 56 which removes the finely divided sulfur formed in the cell by the electrolysis of the dissolved hydrogen sulfide. The sulfur is discharged from the filter through a pipe 57.

To facilitate electrolysis and avoid evolution of oxygen, the electrolyte contains a suitable catalytic agent which increases the conductance of the electrolyte and is of such character as to minimize side reactions. Alkali metal iodides such as potassium and sodium iodides are suitable. A concentration of 5 to 8% of potassium iodide is satisfactory although the degree of concentration is not critical. Clarified potassium iodide solution is fed into the cell through a pipe 58.

In the operation of the apparatus, pulverized iron pyrite 11 is discharged from the feed pipe 17 into the upper end of the reaction tube 10 and descends slowly in the tube under the retarding action of the slowly rotating worm 21 which also insures a 360° contact of the ore with the inner walls of the tube. The heated hydrogen flowing upwardly in the tube in a tortuous path along the worm and reacts with the sulfide ore, forming powdered iron and hydrogen sulfide. Any uncombined sulfur in the ore will also be converted to hydrogen sulfide. The descending powdered iron finally reaches the delivery pipe 19 from which it is periodically withdrawn. The iron may be subjected to further processing, such as agglomerating, briquetting, sintering and fusing, either alone or with other metals or alloying ingredients. The heated hydrogen sulfide, which is accompanied by some hydrogen, leaves the upper end of the reaction tube and flows through the pipe 38, settling chamber 39, and pipe 41, being cooled in its passage through the heat exchanger 43, and preferably being further cooled before entering the electrolytic cell so as to increase the solubility in the water. In the electrolytic cell hydrogen is released at the cathode and finely divided sulfur is precipitated and is withdrawn from the bottom of the cell either through the valve 50 or through the filter discharge pipe 57. In the filter 56, the iodide and other solubles are removed from the sulfur by washing and are returned to the cell through the pipe 54. Normally, no gases are liberated at the anode, but any oxygen which may be liberated at the anode under abnormal conditions will pass out the pipe 51. The hydrogen discharged from the cell passes through the pump 52 and drier 53 and is returned to the reaction chamber through the pipes 34, 33, and 25, being heated in the heat exchanger 43 and being further heated to the desired temperature in the jacketed pipe 25.

The settling tank 39 may serve to collect a reduced metal, or a compound thereof, when the sulfide ore contains two or more metals.

Instead of discharging the reduced metal or other reduction product from the reaction chamber in powdered form, a sufficient degree of heat may be maintained in the lower part of the chamber to effect melting and coalescence of the metal to liquid form.

Certain other metallic sulfide ores, including sulfides of lead and mercury, are also reducible by hydrogen at suitable reaction temperatures to form a reduction product and hydrogen sulfide and can be treated in accordance with the invention.

What I claim as new and desire to secure by Letters Patent is:

1. Apparatus for the reduction of a metallic sulfide ore reducible by hydrogen, comprising a reaction chamber adapted to receive the ore in divided condition and to receive hydrogen for contacting the ore at an elevated reaction temperature to obtain a reduction product and hydrogen sulfide, said chamber having at an end portion an inlet for the ore, and said chamber extending downwardly from said inlet for gravity descent of the ore in said chamber, rotary means for retarding the descent of the ore, said chamber having an inlet at its lower portion for admitting the hydrogen to said chamber for upward flow therein to contact said ore, said chamber having a second hydrogen inlet spaced a substantial distance above said first-named hydrogen inlet, and said chamber further having an outlet at its lower portion for the discharge of the reduction product and having an outlet at its upper portion for the discharge of the hydrogen sulfide.

2. An apparatus for the reduction of a metallic sulfide ore reducible by hydrogen, comprising a generally vertical tubular reaction chamber adapted to receive the ore in divided condition and to receive hydrogen for contacting the ore at an elevated reaction temperature to obtain a reduction product and hydrogen sulfide, said chamber having at its upper end portion an inlet for the ore, rotary worm means fitting loosely in said chamber for retarding the descent of the ore in said chamber and having outwardly sloping helicoidal surfaces gravitationally directing the ore against the inner side walls of said chamber, said chamber having an inlet at its lower portion for admitting hydrogen to said chamber for upward flow therein to contact the ore, and said chamber further having an outlet at its lower portion for the discharge of the reduction product and having an outlet at its upper portion for the discharge of hydrogen sulfide.

References Cited in the file of this patent

UNITED STATES PATENTS

| 960,441 | Thomson | June 7, 1910 |
| 1,034,646 | Rabenalt | Aug. 6, 1912 |
| 1,273,050 | Euler | July 16, 1918 |
| 1,310,724 | Westberg | July 22, 1919 |
| 1,818,579 | Pfleiderer | Aug. 11, 1931 |
| 2,384,971 | Silvasy et al. | Sept. 18, 1945 |
| 2,500,553 | Lykken | Mar. 14, 1950 |

FOREIGN PATENTS

| 1,014 | Great Britain | of 1857 |
| 7,519 | Great Britain | of 1887 |